(12) United States Patent
Lazarus et al.

(10) Patent No.: US 7,065,191 B2
(45) Date of Patent: Jun. 20, 2006

(54) METHOD AND SYSTEM FOR BUDGETING RESOURCES DEDICATED TO PROCESSING NON-VOICE DATA TRAFFIC

(75) Inventors: David B. Lazarus, Elkins Park, PA (US); David P. Resuta, Chalfont, PA (US)

(73) Assignee: General Instrument Corporation, Horsham, PA (US)

( * ) Notice: Subject to any disclaimer, the term of this patent is extended or adjusted under 35 U.S.C. 154(b) by 405 days.

(21) Appl. No.: 10/115,634

(22) Filed: Apr. 4, 2002

(65) Prior Publication Data
US 2004/0213390 A1   Oct. 28, 2004

(51) Int. Cl.
*H04M 15/00* (2006.01)
(52) U.S. Cl. ............................. 379/112.1; 379/112.01; 379/112.03
(58) Field of Classification Search ........... 379/112.01, 379/114.01, 111, 112.1, 112.03, 112.04, 112.05, 379/112.06, 201.05, 133, 88.09; 455/452.1, 455/452.2, 453; 370/229, 230, 232, 352, 370/465, 468, 472, 477
See application file for complete search history.

(56) References Cited

U.S. PATENT DOCUMENTS

| 5,548,587 | A | * | 8/1996 | Bailey et al. | ............ | 370/395.7 |
| 5,655,120 | A | | 8/1997 | Witte et al. | | |
| 6,356,629 | B1 | * | 3/2002 | Fourie et al. | ............ | 379/112.1 |
| 6,731,740 | B1 | * | 5/2004 | Choudhury et al. | ... | 379/221.03 |
| 6,766,010 | B1 | * | 7/2004 | Hosein | ........................ | 379/230 |
| 2001/0024438 | A1 | | 9/2001 | Sugiyama et al. | | |
| 2002/0056007 | A1 | * | 5/2002 | Gersht et al. | ................ | 709/235 |

FOREIGN PATENT DOCUMENTS

| EP | 0948165 A1 | 10/1999 |
| WO | WO 01/26289 A1 | 4/2001 |
| WO | WO 02/17036 A2 | 2/2002 |

OTHER PUBLICATIONS

Qiang Ren and G. Ramamurthy, "A Real-Time Dynamic Connection Admission Controller Based On Traffic Modeling, Measurement, and Fuzzy Logic Control", IEEE Journal On Selected Areas In Communications, vol. 18, No. 2, Feb. 2000.*
PCT International Search Report for PCT/US03/10274, mailed Aug. 8, 2003, 7 pages.

* cited by examiner

*Primary Examiner*—Barry Taylor
(74) *Attorney, Agent, or Firm*—Lawrence T. Cullen (57) ABSTRACT

A method and system that processes voice and non-voice data is configured to insure that the processing of the voice data is given priority over the processing of the non-voice data, to ensure that callers experience smooth, uninterrupted conversations. An estimate of processing load dedicated to processing only non-voice data is calculated. A plurality of quota data objects are established to monitor and control the allocation of the processing load dedicated to processing only the non-voice data during a current quota period.

25 Claims, 8 Drawing Sheets

| MEMORY | | |
|---|---|---|
| COMMUNICATION INTERFACE A | COMMUNICATION INTERFACE B | COMMUNICATION INTERFACE C |
| $QV1_A$ 205 | $QV1_B$ 210 | $QV1_C$ 215 |
| $QV2_A$ 220 | $QV2_B$ 225 | $QV2_C$ 230 |
| $QV3_A$ 235 | $QV3_B$ 240 | $QV3_C$ 245 |
| $QV4_A$ 250 | $QV4_B$ 255 | $QV4_C$ 260 |

METHOD AND SYSTEM FOR BUDGETING RESOURCES DEDICATED TO PROCESSING NON-VOICE DATA TRAFFIC

BACKGROUND OF THE INVENTION

1. Field of the Invention

The present invention generally relates to the monitoring and control of data traffic in a telecommunications system.

2. Background Information

Cable-based IP telephony is a simplified and consolidated communication service that can be provided at a lower cost than consumers currently pay to separate Internet, television and telephony service providers. The use of the Internet for real-time voice applications is rapidly increasing. The goal of Internet Protocol (IP) telephony employing cable modem technology is to combine telephony, video, and data signals over a cable distribution infrastructure.

The Voice over IP (VoIP) gateway bridges the public switched telephone network (PSTN) or integrated services digital network (ISDN) with the packet-switched data network (TCP/IP Local Area Network). Such a VoIP gateway is configured to provide IP call control and IP data transport, which includes the compression and decompression of voice channels. VoIP is a relatively new service capable of being supported by Data Over Cable Systems Interface Specification (DOCSIS) cable networks. DOCSIS describes a standard for the cable modem interface between a cable TV operator and a computer. DOCSIS has been accepted as the standard for devices that handle incoming and outgoing data signals across this interface. DOCSIS 1.0 was ratified by the International Telecommunication Union (ITU) in March 1998. Cable modems conforming to DOCSIS are available in many areas where cable operators operate. DOCSIS is an evolving standard which specifies modulation schemes and protocols for exchange of bi-directional signals over cable, allowing version 4 IP traffic to achieve transparent transfer between the Cable Modem Termination System-Network Side Interface (CMTS-NSI) and the Cable Modem to Customer Premise Equipment Interface (CMCI). Upgrades to existing cable modems and DSPs to maximize VoIP quality can be achieved by changing the programming in their EEPROM flash memory.

The DOCSIS 1.1 specification was enhanced with quality of service (QoS) features that are necessary for voice communication and enables the prioritization of packet traffic. This allows cable operators to give certain packets (e.g., voice) the right of way and allows other traffic to be sent with a "best effort" priority as determined by bandwidth availability.

Traditional methods of balancing the processing of voice and non-voice data implement multi-tasking algorithms based on priorities and low-overhead design. These methods have operated successfully under normal conditions. Under stressful or hostile conditions, these methods break down and fail to provide the robustness required for a quality telephony product.

A broadband telephony interface (BTI) can usually support multiple phone calls concurrently with web surfing and file transfer protocol (FTP) operations without any problems. The reported problems arise when the BTI is subjected to both heavy voice traffic and a large volume of data traffic. This traffic can come from the hybrid fiber coaxial (HFC) network, the Ethernet, the universal serial bus (USB), or a home network. It is most likely routed to the same set of interfaces. This traffic can impact voice in the following ways:

(1) It adds to the overall processing load of the processor;
(2) It consumes resources (such as queues and memory buffers) that are needed to support voice;
(3) It consumes transmission opportunities that could have been used by voice;
(4) It may block voice processing at critical sections by holding semaphores;
(5) It may add jitter and delay to voice processing timing when the interface hardware interrupts; and
(6) It may add jitter and delay to voice processing timing where data is processed by the same task. A common failure is when the BTI receives Ethernet traffic at a rate exceeding the data processing capability of the BTI.

Callers using a VoIP gateway send and receive voice packets to and from other VoIP gateways. These packets must be given priority over data packets to ensure that the callers experience smooth, uninterrupted conversations.

SUMMARY OF THE INVENTION

The present invention allows for the proper operation of voice under even the most hostile data environments. A basic premise of the present invention is that voice has priority over non-voice data. Further, data to support voice has priority over other data. As a result, non-voice data may be delayed or even lost, to protect the integrity of the voice stream.

In a preferred embodiment, the present invention allocates processing load of a communications system that receives and processes communication signals including voice data and non-voice data. An estimate of processing load of the communications system dedicated to processing only the non-voice data is calculated. A plurality of quota data objects is established. The data objects are used to monitor and control the allocation of the processing load dedicated to processing only the non-voice data during a current quota period.

The communications system may include a plurality of communication interfaces and at least one memory. For each of the communication interfaces, various quota values may be stored in the memory. A first quota value may represent an interface or system total bytes quota limit indicating a maximum number of bytes of non-voice data that can be processed during the current quota period. A second quota value may represent an interface or system total bytes quota balance indicating the number of bytes of non-voice data that can still be processed during the current quota period. A third quota value may represent an interface or system packet count quota limit indicating a maximum number of non-voice data packets that can be processed during the current quota period. A fourth quota value may represent an interface or system packet count quota balance indicating the number of non-voice data packets that can still be processed during the current quota period.

In one embodiment of the present invention, a non-voice data packet may be received including a message having an actual number of bytes of non-voice data. A predetermined number of bytes may be added to the actual number of bytes of non-voice data to obtain an adjusted number of bytes. The adjusted number of bytes may be subtracted from the total bytes quota balance to obtain a new second quota value. The non-voice data packet may be processed if the new second quota value is greater than or equal to zero.

An estimate of processing load dedicated to processing only the voice data may be calculated based on the current volume of voice data being received by the communications system. The estimate of processing load dedicated to processing only the voice data may be subtracted from a processing load that is made available for processing both the voice data and non-voice data, to obtain the estimate of processing load dedicated to processing only the non-voice data.

A number of active voice channels over which communication signals including voice data are received may be determined. A maximum processing load required to support a single one of the active voice channels may be estimated. The number of active voice channels may be multiplied by the estimated maximum processing load, to obtain the processing load dedicated to processing only the voice data for all of the active voice channels. The processor load actually required to support all of the active voice channels may be determined. The estimate of the maximum processing load may be reduced if the processing load actually required to support all of the actual voice channels is less than the estimated maximum processing load.

Another way that a number of active voice channels over which communication signals including voice data are received may be determined is by estimating, for each active voice channel, a maximum processing load required to support the active voice channel. The estimated maximum processing loads of each active voice channel may be added to determine a total processing load dedicated to processing only the voice data.

The communications system may receive a non-voice data packet including a message having an actual number of bytes of non-voice data. The actual number of bytes of non-voice data may be subtracted from the total bytes quota balance to obtain a new second quota value. The fourth quota value may be decremented by one to obtain a new fourth quota value. The non-voice data packet may be processed if the new second and fourth quota values are greater than or equal to zero.

When a quota limit is exceeded, the communications system may discard non-voice data that exceeds the established quota limit, disable interrupts, or temporarily reduce the flow of non-voice data packets. The communication interface may be a broadband telephony interface (BTI) or an embedded Media Terminal Adapter (eMTA) located in a voice-over-cable modem (VoCM).

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DETAILED DESCRIPTION OF THE INVENTION

The present invention uses software to monitor the level of voice traffic and estimates the processing resources necessary to support the voice traffic. Based on the estimate, the software estimates what is leftover for the non-voice data traffic and develops a budget to limit the non-voice data. The budget is implemented as a series of quota values for each communication interface. Each time the status of a phone call changes, the estimate of the processing resources committed to voice transport are recalculated and a new budget for non-voice data is computed.

Figure 1:
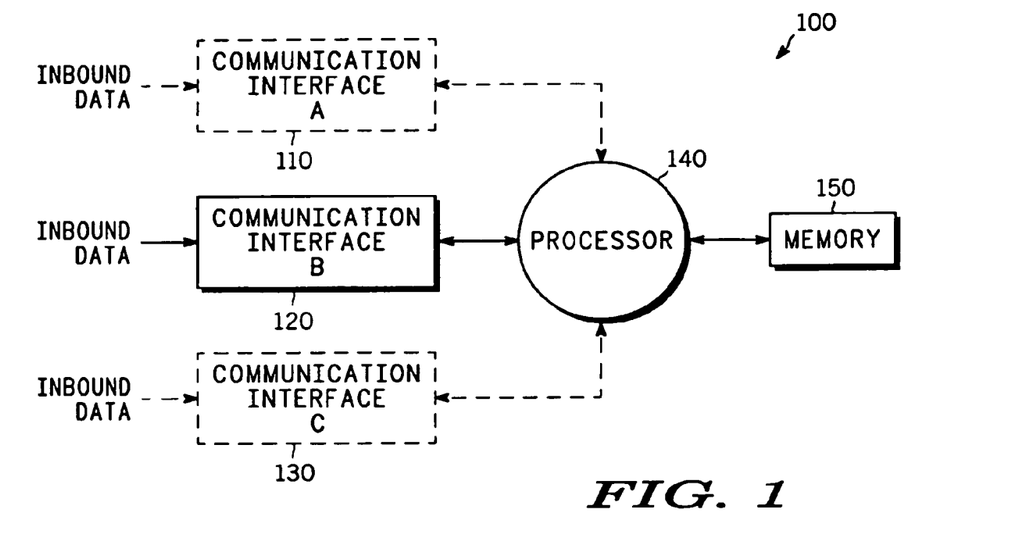
FIG. 1 is a block diagram of a communications system operating in accordance with the present invention.

FIG. 1 shows a communications system 100 that receives and processes communication signals including voice data and non-voice data. The communications system 100 includes one or more communication interfaces 110, 120, 130, which receive the communication signals, a processor 140 in communication with the communication interfaces 110, 120, 130, and at least one memory 150 in communication with the processor. The processor 140 calculates an estimate of processing load of the communications system 100 dedicated to processing only the non-voice data. The memory 150 stores a plurality of quota data objects used to monitor and control the allocation of the processing load of the system dedicated to processing only the non-voice data during a current quota period. The communications system 100 can be a voice-over-cable modem (VoCM) having one or more broadband telephony interfaces (BTIs) or embedded Media Terminal Adapters (eMTAs) which enable cable operators to offer subscribers IP telephony and high-speed data services.

When a packet arrives on a communication interface 120, it is processed based on the status of a non-voice data quota. If the communication interface 120 is determined to have enough capacity to handle the packet without impeding on processing load reserved for handling voice data (i.e., it does not exceed a constantly updated quota), the packet is processed. The packet is counted against all quota values that pertain to the communication interface 120. If the communication interface 120 does not meet a quota, corrective action is taken as follows:

(1) One possible corrective action is for the communications system 100 to discard non-voice data that exceeds an established quota limit.

(2) Another possible corrective action is for the communications system 100 to disable interrupts received from the communication interface 120 or disable the capability of the communication interface 120 to receive messages.

(3) And yet another possible corrective action would be to contact a device on the inbound data side of the communication interface 120 and command the device to reduce the flow rate of data received from the device by communication interface 120.

For example, the rate of downstream data traffic received on the HFC interface of the cable modem (CM) could be reduced by a Data-Over-Cable Service Interface Specifications (DOCSIS) communications system using DOCSIS Mac messages. By using a Dynamic Service Change (DSC) message, the maximum data rate of the downstream data service flow can be dynamically limited during the entire period of a phone call or when the CM is overloaded. Statistics are maintained on how many packets and bytes are dropped, and how many times an interrupt is disabled. When voice traffic is terminated, the service flow for the non-voice data is restored to its initial parameters.

Periodically, the quotas are all reset to initial predetermined values for the next quota period. For example, if the quotas are reset 100 times a second, the quota values would limit data for only the quota period of one hundredth of a second. If the flow of non-voice data to communication interface 120 was discarded or temporarily reduced due to a quota being exceeded during a current quota period, the initiation of a new quota period would cause the quota values to be reset, and the communication interface 120 would again have adequate processing load to process received non-voice data. If an interrupt for a specific communication interface was disabled solely because that specific communication interface exceeded a quota limit, the interrupt is re-enabled when the new quota period is initiated.

Figure 2:
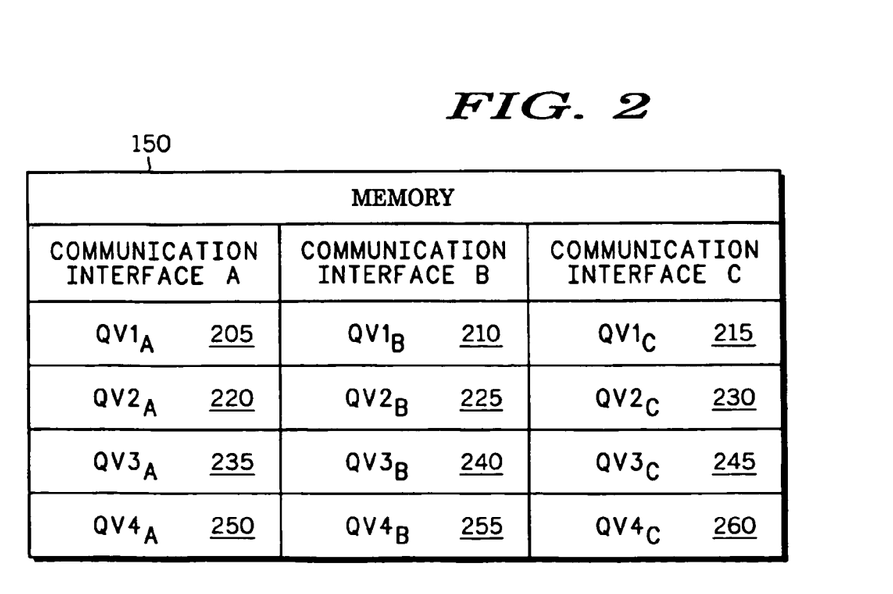
FIG. 2 is an exemplary database structure used to store and process interface quota values in accordance with the present invention.

FIG. 2 shows an exemplary database structure located within memory 150 that is used to store and process interface quota values for each of communication interfaces 110, 120, 130 (hereafter, referred to as communication interfaces A, B, C). A plurality of quota data objects are established and used to monitor and control the allocation of the processing load dedicated to processing only non-voice data received and processed by the communication interfaces (A, B, C) of communications system 100 during a current quota period.

For each communication interface (A, B, C) of the communications system 100, the following interface quota data objects are established:

(1) first interface quota values $QV1_A$, $QV1_B$, $QV1_C$, stored in respective memory locations 205, 210, 215 of memory 150, each first quota value representing an interface total bytes quota limit indicating a maximum number of bytes of non-voice data that can be processed by a respective communication interface (A, B, C) during the current quota period; and (2) second interface quota values $QV2_A$, $QV2_B$, $QV2_C$, stored in respective memory locations 220, 225, 230 of memory 150, each second quota value representing an interface total bytes quota balance indicating the number of bytes of non-voice data that can still be processed by a respective communication interface (A, B, C) during the current quota period.

Optionally, for each communication interface (A, B, C) of the communications system 100, the following additional interface quota data objects may be established:

(3) third interface quota values $QV3_A$, $QV3_B$, $QV3_C$, stored in respective memory locations 235, 240, 245 of memory 150, each third quota value representing an interface packet count quota limit indicating a maximum number of non-voice data packets that can be processed by a respective communication interface (A, B, C) during the current quota period; and (4) fourth interface quota values $QV4_A$, $QV4_B$, $QV4_C$, stored in respective memory locations 250, 255, 260 of memory 150, each fourth quota value representing an interface packet count quota balance indicating the number of non-voice data packets that can be still be processed by a respective communication interface (A, B, C) during the current quota period.

Figure 3:
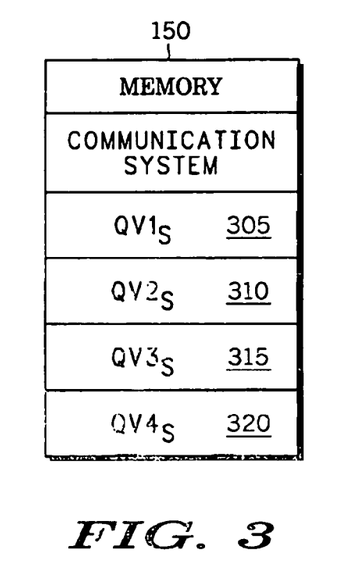
FIG. 3 is an exemplary database structure used to store and process system quota values in accordance with the present invention.

FIG. 3 shows an exemplary database structure located within memory 150 that is used to store and process system quota values for communications system 100, alone or in conjunction with the interface quota values. A plurality of quota data objects are established and used to monitor and control the allocation of the processing load dedicated to processing only non-voice data received and processed by communications system 100 during a current quota period.

For example, each of communication interfaces A, B and C has a byte quota that is set to 700 bytes and the communications system 100 has a byte quota that is set to 2000 bytes. If, during a quota period, the interface A receives 900 bytes of non-voice message traffic, interface B receives 300 bytes of non-voice message traffic and interface C receives 600 bytes of non-voice traffic, then all of the non-voice message traffic received by interfaces B and C is processed. However, the 200 bytes of message traffic received by interface A that exceeds the individual byte quota of interface A is not processed, even though the total number of bytes received by interfaces A, B and C does not exceed the byte quota of communications system 100.

For communications system 100, the following system quota data objects are established:

(1) first system quota value $QV1_s$, stored in memory location 305 of memory 150, represents a system total bytes quota limit indicating a maximum number of bytes of non-voice data that can be processed by the communications system 100 during the current quota period; and (2) second system quota value $QV2_s$, stored in memory location 310 of memory 150, represents a system total bytes quota balance indicating the number of bytes of non-voice data that can still be processed by the communications system 100 during the current quota period.

Optionally, for communications system 100, the following additional system quota data objects may be established:

(3) third system quota value $QV3_s$, stored in memory location 315 of memory 150, represents a system packet count quota limit indicating a maximum number of non-voice data packets that can be processed by the communications system 100 during the current quota period; and (4) fourth system quota value $QV4_s$, stored in memory location 320 of memory 150, representing a system packet count quota balance indicating the number of non-voice data packets that can be still be processed by the communications system 100 during the current quota period.

Figure 4:
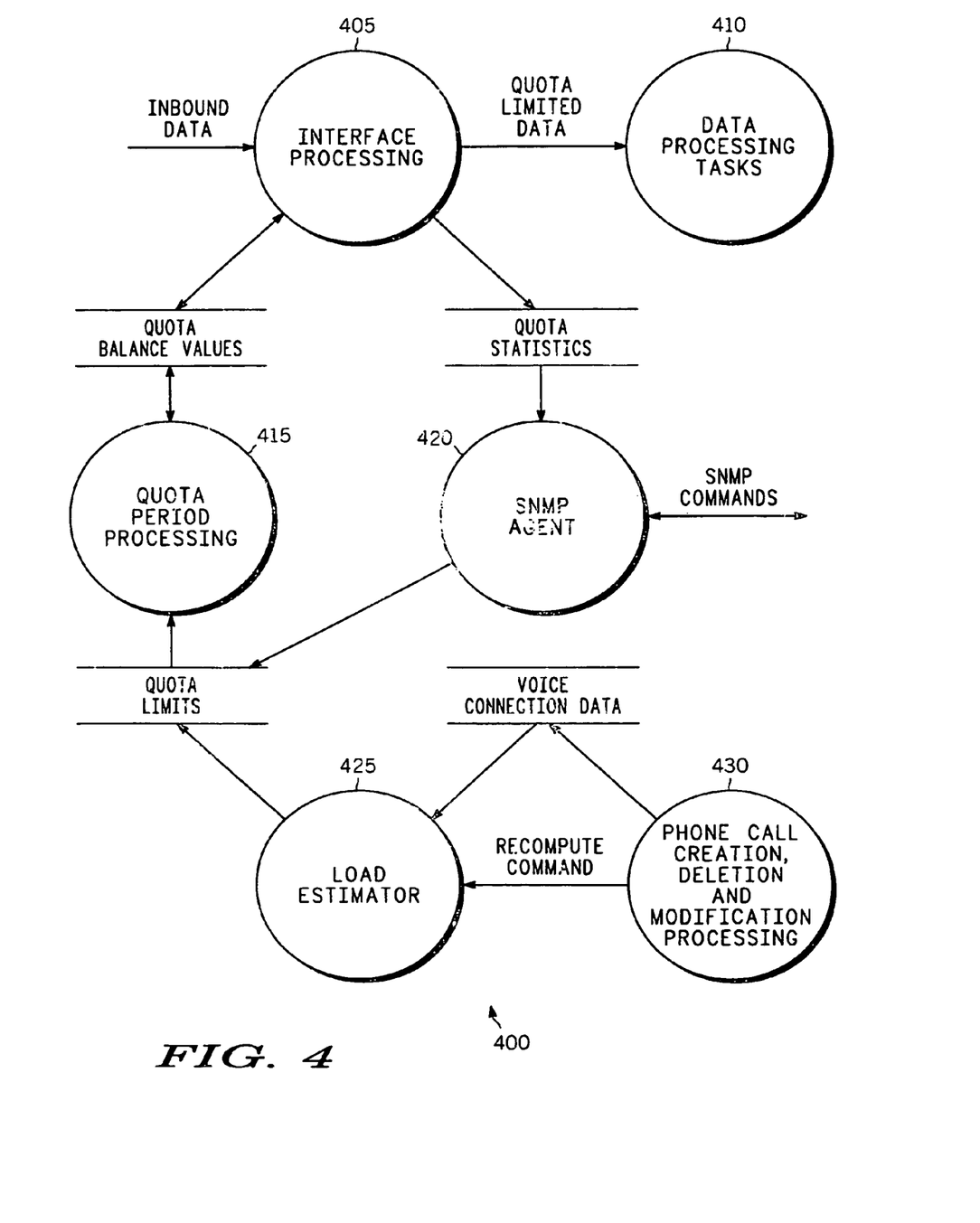
FIG. 4 is a data flow diagram for processes implemented by the communications system of FIG. 1.

FIG. 4 shows a data flow diagram of functions 400 implemented by processor 140. When inbound data is received by communications system 100, an interface processing function 405 determines whether or not the inbound data should be processed. The quota data objects in memory 150 are constantly updated during a current quota period as more and more inbound data is received for processing. Once it is determined by the interface processing function 405 that the inbound data does not exceed an established quota, the inbound data is forwarded by the interface processing function 405 to data processing tasks function 410 for normal processing, such as routing or forwarding the inbound data to another interface.

The determination made by interface processing function 405 is implemented by querying memory 150, accessing the quota data objects stored within memory 150, and performing various algorithms on the quota data objects to determine whether there is adequate processing load available to process non-voice data without sacrificing processing load required to handle voice data. The determination process is implemented using one or more of the following functions:

(1) a quota period processing function 415 used to establish quota balance values by setting each quota balance to the current value of the corresponding quota limit;

(2) a simple network management protocol (SNMP) agent function 420 that uses quota statistics to establish quota limits;

(3) a load estimator function 425 that is used to establish the quota limits based on voice connection data; and (4) a phone call creation, deletion and modification processing function 430 that provides updated voice connection data, and commands the load estimator to re-calculate update quota limits based on the updated voice connection data.

The voice connection data, such as the estimated total cost of voice ($T_{CV}$), is recomputed whenever a connection is setup, torn down or modified, as determined by the phone call creation, deletion and modification function 430. The estimated total cost of voice ($T_{CV}$) is computed by the load estimator function 425 summing the estimated cost per voice channel ($E_{CVC}$) for n voice connections. The term "cost" refers to the processing load that must be reserved to reliably support communications. The estimated cost per voice channel ($E_{CVC}$) is computed by the sum of the fixed cost per voice channel ($F_{CVC}$) and the product of the number of packets per second ($N_P$) times the cost per voice packet ($C_{VP}$) at a specified packet length ($L_P$). This is summarized by the following formulas:

$$E_{CVC} = F_{CVC} + (N_P \times C_{VP})$$

$$T_{CV} = \Sigma E_{CVCn}$$

where $L_P$ and $N_P$ are specified in the create/modify connection command, and $F_{CVC}$ and $C_{VP}$ are determined experimentally. Based on the updated $T_{CV}$, new quota limits are selected.

Alternatively, the cost per voice packet ($C_{VP}$) is computed by the sum of the fixed cost per packet ($F_{CP}$) and the product of the cost per byte ($C_B$) times the packet length ($L_P$). This is summarized by the following formula:

$$C_{VP} = F_{CP} + (C_B \times L_P).$$

Figure 5:
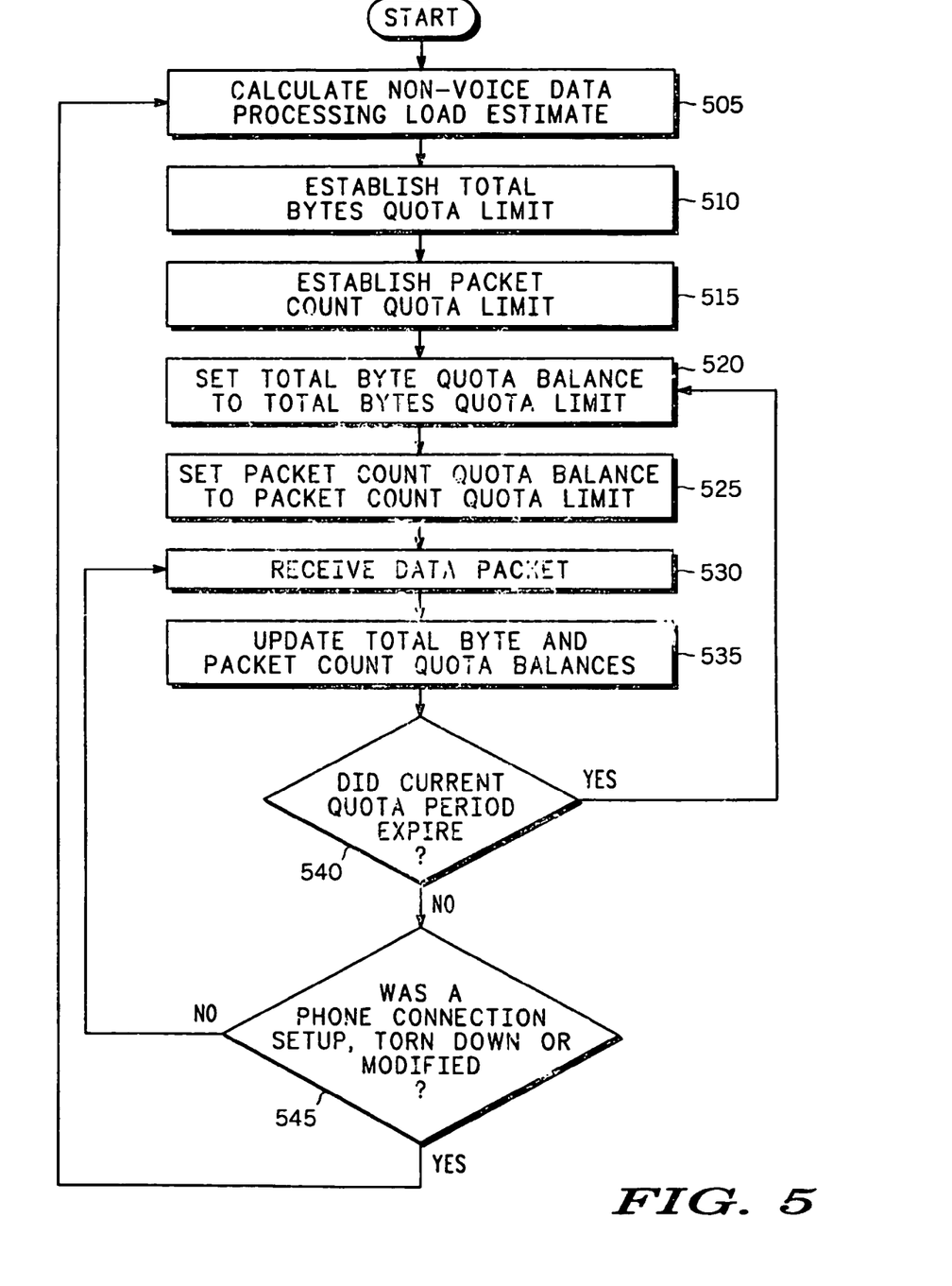
FIGS. 5–10 are high-level functional flowcharts including steps implemented by the communications system of FIG. 1.

FIG. 5 shows the steps implemented by a computer-implemented method that allocates processing load of a communications system 100 that receives and processes communication signals including voice data and non-voice data. In step 505, a calculation is performed to estimate the processing load of the communications system 100 dedicated to processing only the non-voice data. In steps 510, 515, 520 and 525, a plurality of quota data objects are established, on an individual interface and/or system basis, to monitor and control the allocation of the processing load dedicated to processing only the non-voice data during a current quota period. In step 510, a total bytes quota limit is established. In step 515, a packet count quota limit is established. In step 520, a total byte quota balance is set to the total bytes quota limit established in step 510. In step 525, a packet count quota balance is set to the packet count quota limit established in step 515. In step 530, a data packet is received. In step 535, the total byte quota balance and the packet count quota balance are updated in response to the received data packet. If, in step 540, it is determined that the current quota period expired, the process returns to step 520. If, in step 540, it is determined that the current quota period did not expire, it is determined in step 545 whether a phone connection was setup, torn down or modified. If, in step 545, it is determined that a phone connection was not setup, torn down or modified, the process returns to step 530 to process another received data packet. If, in step 545, a phone connection was determined to be setup, torn down or modified, the process returns to step 505.

Figure 6:
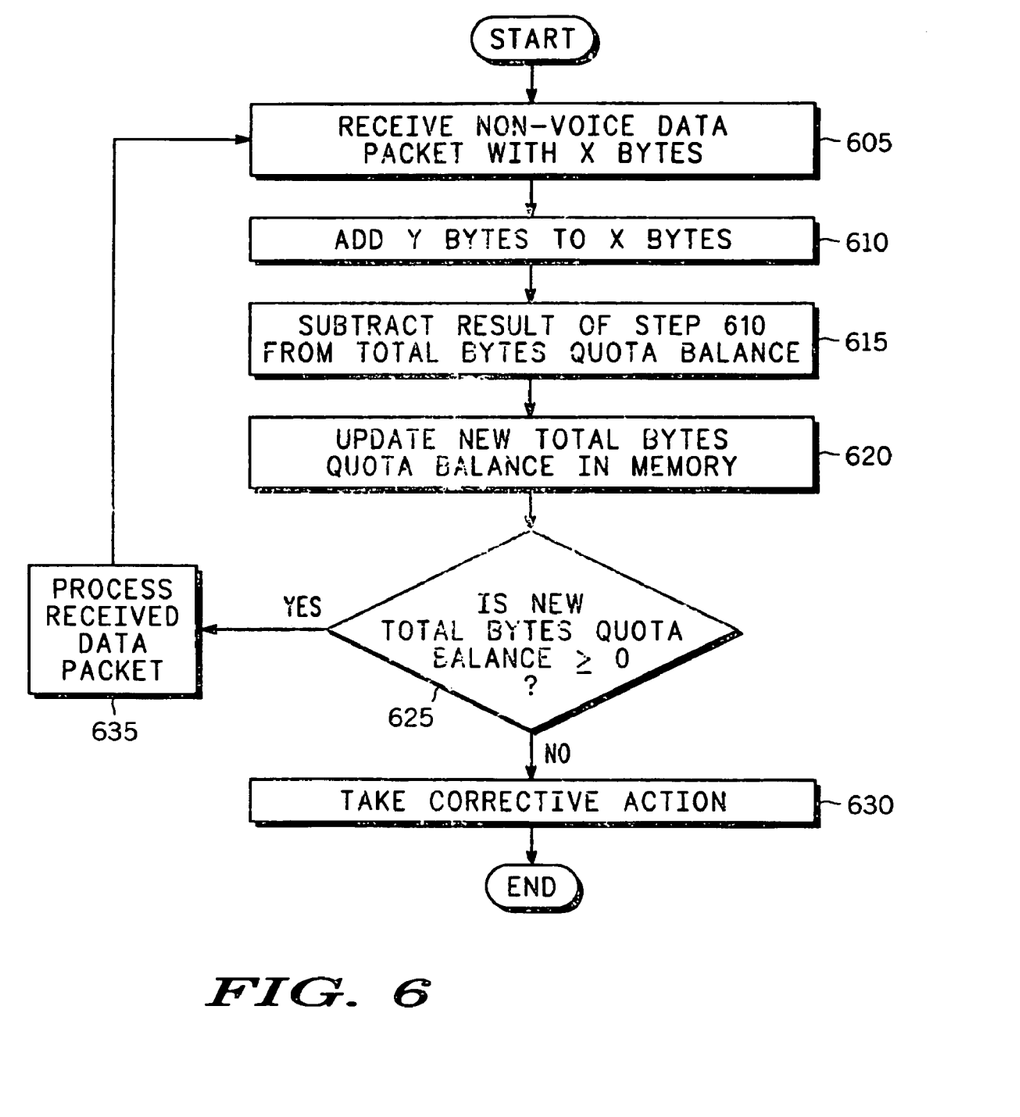

FIG. 6 shows a preferred embodiment of the present invention used to process the quota data objects, on an individual interface and/or system basis. In step 605, a non-voice data packet, including a message, is received at a specific one of the communication interfaces (A, B, C) of communications system 100. The message includes an actual number of bytes (X) of non-voice data. In step 610, a predetermined number of bytes (Y), constituting a fixed penalty, is added to the actual number of bytes (X) to obtain an adjusted number of bytes (X+Y). In step 615, the adjusted number of bytes (the result of step 610) is subtracted from the second quota value (e.g., $QV2_A$, $QV2_B$, $QV2_C$, $QV2_S$) to obtain a new second quota value. As previously mentioned, the second quota value represents a total bytes quota balance indicating the number of bytes of non-voice data that can still be processed by the specific communication interface (A, B, C) and/or the communications system 100 during the current quota period. In step 620, the new second quota value is updated in memory 150. If, in step 625, it is determined that the new second quota value is greater than or equal to zero, the received non-voice data packet is processed by the specific communication interface (A, B, C) of communications system 100 (step 635). If, in step 625, it is determined that the new second quota value is less than zero, corrective action is taken as previously described (step 630).

Figure 7:
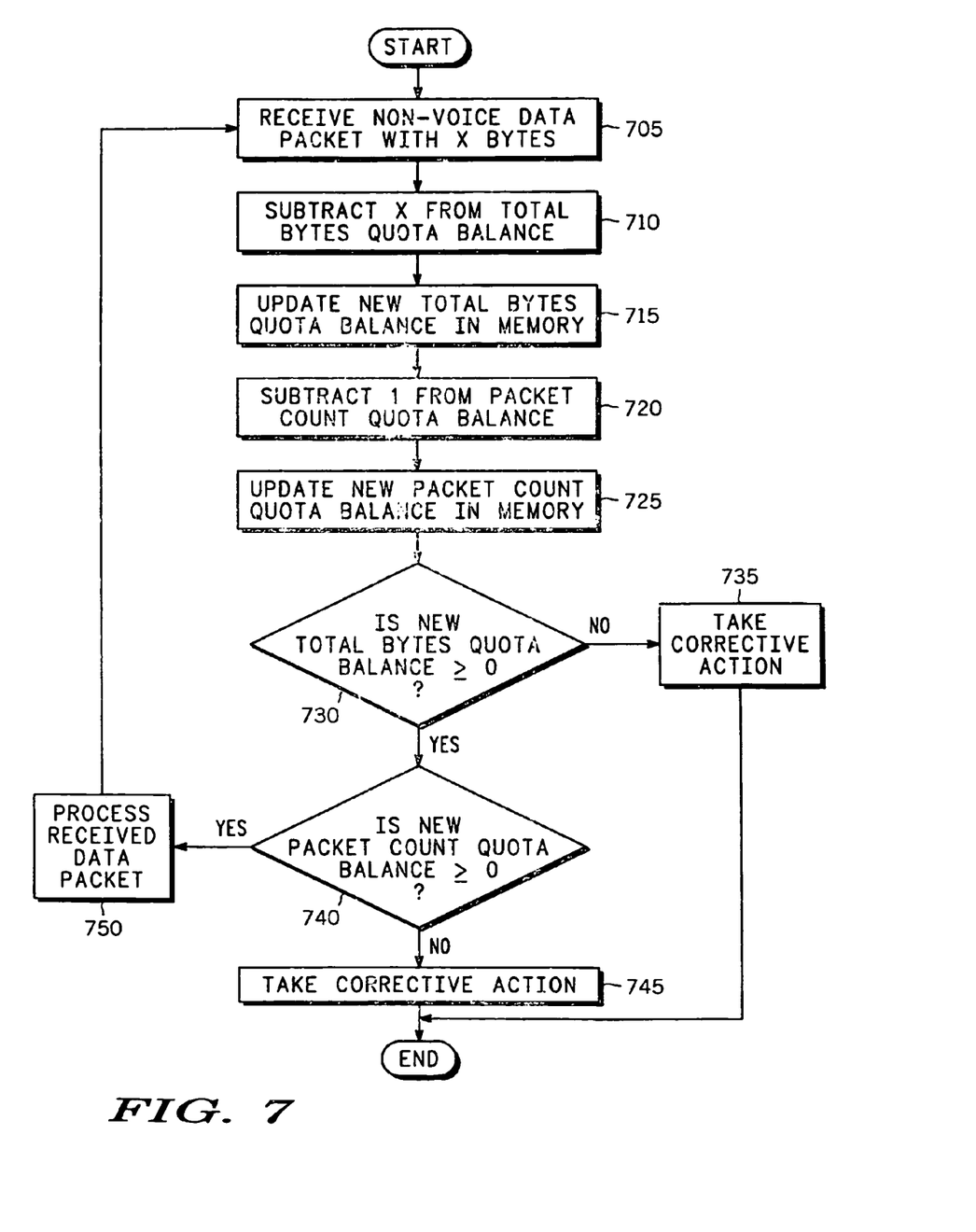

FIG. 7 shows an alternate embodiment of the present invention used to process the quota data objects, on an individual interface and/or system basis. In step 705, a non-voice data packet, including a message, is received at a specific one of the communication interfaces (A, B, C) of communications system 100. The message includes an actual number of bytes (X) of non-voice data. In step 710, the actual number of bytes (X) is subtracted from the second quota value (e.g., $QV2_A$, $QV2_B$, $QV2_C$, $QV2_S$) to obtain a new second quota value. In step 715, the new second quota value is updated in memory 150. In step 720, the fourth quota value (e.g., $QV4_A$, $QV4_B$, $QV4_C$, $QV4_S$) is decremented by one to obtain a new fourth quota value. As previously mentioned, the fourth quota value represents an interface packet count quota balance indicating the number of non-voice data packets that can be still be processed by the specific communication interface (A, B, C) of communications system 100 during the current quota period. In step 725, the new fourth quota value is updated in memory 150. If, in steps 730 and 740, it is determined that the new second and fourth quota values are both greater than or equal to zero, the received non-voice data packet is processed by the specific communication interface (A, B, C) of communications system 100 (step 750). If, in step 730, the new second quota value is determined to be less than zero, corrective action is taken as previously described (step 735). If, in step 740, the new fourth quota value is determined to be less than zero, corrective action is taken as previously described (step 745).

Figure 8:
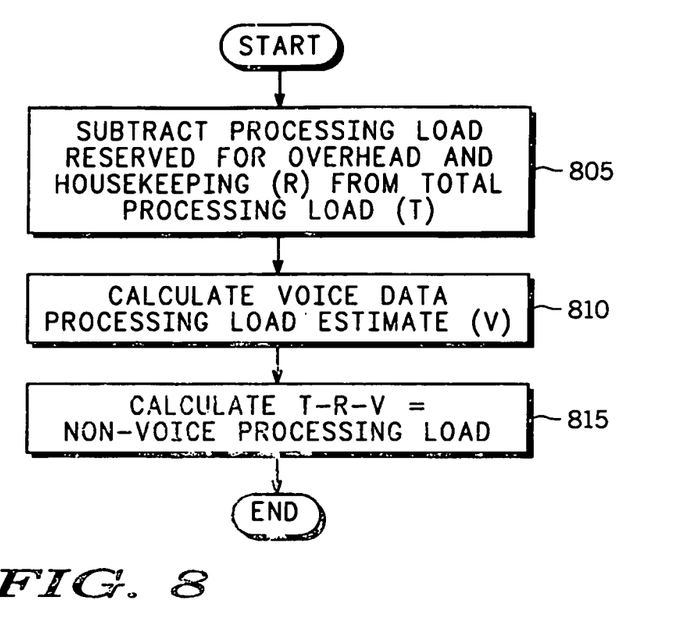

FIG. 8 shows how an estimate of processing load dedicated to processing only non-voice data is determined. In step 805, a predetermined processing load (R) reserved for overhead and housekeeping of the communications system 100 is subtracted from the total processing load capacity (T) of the communications system 100, to obtain an estimate of the processing load (T−R) that is made available for processing both the voice data and non-voice data. In step 810, a calculation is performed to estimate the processing load (V) dedicated to processing only the voice data based on the current volume of voice data being received by the communications system 100. In step 815, the estimate of processing load (V) dedicated to processing only the voice data is subtracted from the processing load (T−R) that is made available for processing both the voice data and non-voice data, to obtain the estimate of processing load (T−R−V) dedicated to processing only the non-voice data.

For example, processor 140 has a total processing load capacity (T) of 100 million instructions per second (MIPS). After subtracting 15 MIPS for overhead and housekeeping (R), there is 85 MIPS (T−R) left to use for processing voice data and non-voice data. It is also assumed that 20 millisecond voice packets are processed in communications system 100 at a cost per voice packet ($C_{VP}$) of 0.1 MIPS. If the fixed cost per voice channel ($F_{CVC}$) is 1 MIP and the packetization period is 20 milliseconds, the packet transmission rate ($N_P$) will be 100 packets per second (50 packets upstream and 50 packets downstream). The estimated cost per voice channel ($E_{CVC}$) is summarized by the following formula:

$$E_{CVC} = F_{CVC} + (N_p \times C_{VP})$$
$$= 1 + (100 \times 0.1)$$
$$= 1 + 10$$
$$= 11 MIPS.$$

If there were two active voice channels, the estimated total cost of voice ($T_{CV}$) would be 22 MIPS, leaving 63 MIPS for data. Thus, the resources available to process non-voice data is reduced by a 63/85 ratio.

Figure 9:
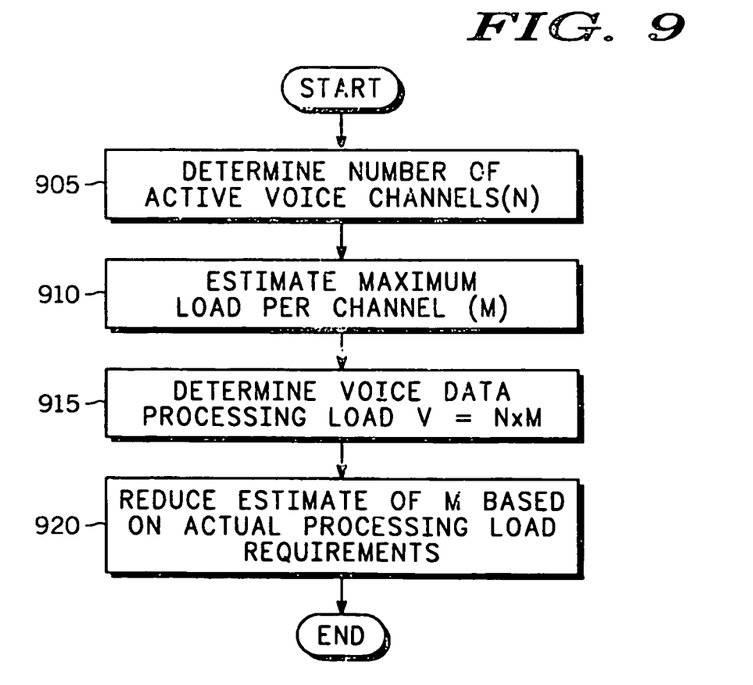

FIG. 9 shows how estimated processing requirements for voice channels can be reduced when more reliable and up-to-date information is available, so that more processing resources can be allotted to the processing of non-voice data. For example, resources are typically reserved for processing larger G.711 packets at the beginning of a phone call. However, after negotiation, a low-rate vocoder may be selected that requires smaller packets. As a result, the excess processing resources can be released to support more data transport. When communication signals including voice data are received over a plurality of active voice channels, the number of active voice channels (N) is determined (step 905). In step 910, a calculation is performed to estimate a maximum processing load (M) required to support a single one of the active voice channels. In step 915, the number of active voice channels (N) is multiplied by the estimated maximum processing load (M), to obtain the processing load (V=N×M) dedicated to processing only the voice data for all of the active voice channels. In step 920, the processing load actually required to support all of the active voice channels is determined, and the estimate of the maximum processing load (M) is reduced if the processing load actually required to support all of the active voice channels is less than the estimated maximum processing load (M).

Figure 10:
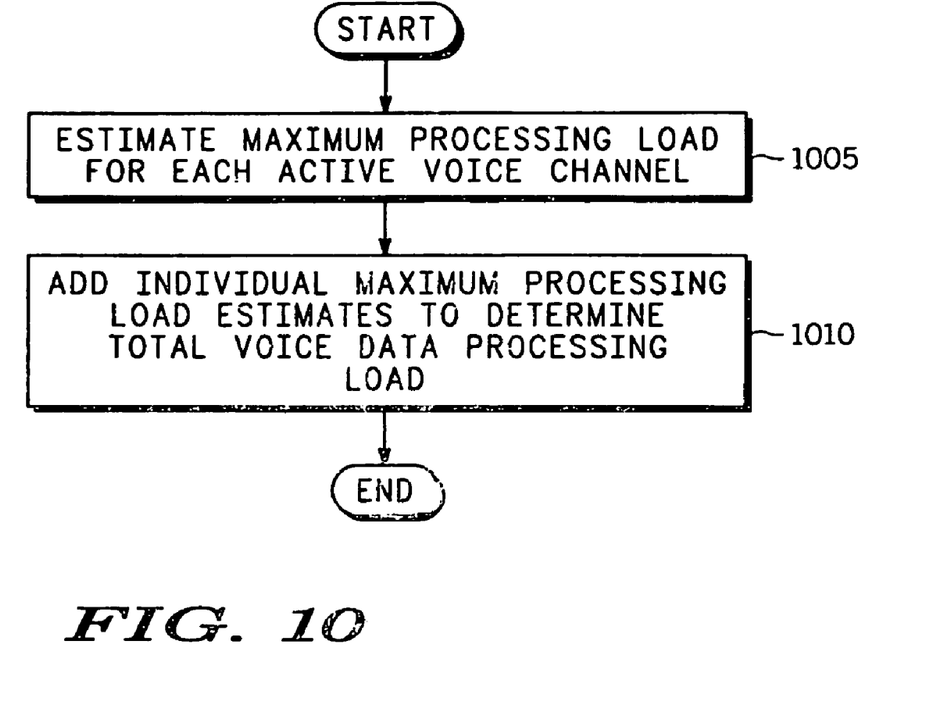

FIG. 10 shows an alternate embodiment of the present invention for estimating processing requirements for voice channels. In step 1005, a maximum processing load required to support each active voice channel is estimated. In step 1010, the estimated maximum processing loads of each of the active voice channels are added together to determine a total processing load dedicated to processing only the voice data.

Instead of relying on a model of processor load, the communications system 100 could measure processor load and compute quota values based on the measured value. By measuring idle and sleep time either periodically or at key event times, an estimate of unused processor resources can be made.

Furthermore, a panic mode could be added in which stricter quota values are used to assist the communications system 100 in a catastrophic scenario. For instance, if a critical queue backs up too far, the stricter quota values could be implemented until traffic handled by the communications system 100 is alleviated.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computer-implemented method of allocating a processing load of a packet based communications system that receives and processes communication signals including voice packet data and non-voice packet data, the method comprising:

(a) calculating an estimate of processing load of the communications system dedicated to processing only the non-voice data; and (b) establishing values for a plurality of quota data objects based on the estimate, the quota data objects being used to monitor and control the allocation of the processing load dedicated to processing only the non-voice data during a current quota period, wherein when a processing load of the voice data changes the estimate of processing load is recalculated and the value of the plurality of quota data objects is re-established.

2. The method of claim 1 wherein the communications system includes a plurality of communication interfaces and at least one memory, and step (b) further comprises:

(i) storing in the memory, for each of the communication interfaces, a first quota value representing an interface total bytes quota limit indicating a maximum number of bytes of non-voice data that can be processed by the communication interface during the current quota period; and (ii) staring in the memory, for each of the communication interfaces, a second quota value representing an interface total bytes quota balance indicating the number of bytes of non-voice data that can still be processed by the communication interface during the current quota period.

3. The method of claim 2 further comprising:

(c) receiving at a specific one of the communication interfaces a non-voice data packet including a message having an actual number of bytes of non-voice data;

(d) adding a predetermined number of bytes to the actual number of bytes of non-voice data to obtain an adjusted number of bytes;

(e) subtracting the adjusted number of bytes from the interface total bytes quota balance to obtain a new second quota value; and (f) the specific communication interface processing the non-voice data packet if the new second quota value is greater than or equal to zero.

4. The method of claim 2 wherein step (b) further comprises:
(iii) storing in the memory, for each of the communication interfaces, a third quota value representing an interface packet count quota limit indicating a maximum number of non-voice data packets that can be processed by the communication interface during the current quota period; and
(iv) storing in the memory, for each of the communication interfaces, a fourth quota value representing an interface packet count quota balance indicating the number of non-voice data packets that can still be processed by the communication interface during the current quota period.

5. The method of claim 4 further comprising:
(c) receiving at a specific one of the communication interfaces a non-voice data packet including a message having an actual number of bytes of non-voice data;
(d) subtracting the actual number of bytes of non-voice data from the interface total bytes quota balance to obtain a new second quota value;
(e) decrementing the fourth quota value by one to obtain a new fourth quota value; and
(f) the specific communication interface processing the non-voice data packet if the new second and fourth quota values are greater than or equal to zero.

6. The method of claim 2 further comprising:
(c) the communications system discarding non-voice data when a quota limit established for at least one of the communication interfaces is exceeded.

7. The method of claim 2 further comprising:
(c) the communications system disabling interrupts received from the communication interface when a quota limit established for at least one of the communication interfaces is exceeded.

8. The method of claim 2 further comprising:
(c) the communications system temporarily reducing the flow of non-voice data packets to the communication interface when a quota limit established for at least one of the communication interfaces is exceeded.

9. The method of claim 2 further comprising:
(c) periodically establishing a new current quota period; and
(d) setting the quota values to predetermined values when the new current quota period is established.

10. The method of claim 2 further comprising:
(c) establishing a new current quota period after a quota limit established for one of the communication interfaces is exceeded, and previously unavailable processing load is currently available to process the non-voice data.

11. The method of claim 1 wherein step (a) further comprises:
(i) calculating an estimate of processing load dedicated to processing only the voice data based on the current volume of voice data being received by the communications system; and
(ii) subtracting the estimate of processing load dedicated to processing only the voice data from a processing load that is made available for processing both the voice data and non-voice data, to obtain the estimate of processing load dedicated to processing only the non-voice data.

12. The method of claim 11 wherein the processing load that is made available for processing both the voice data and non-voice data is less than the total processing load capacity of the communications system, and step (a) further comprises:
(iii) subtracting a predetermined processing load reserved for overhead and housekeeping of the communications system from the total processing load capacity of the communications system, to obtain an estimate of the processing load that is made available for processing both the voice data and non-voice data.

13. The method of claim 1 wherein the communications system includes at least one memory, and step (b) further comprises:
(i) storing in the memory, a first quota value representing a system total bytes quota limit indicating a maximum number of bytes of non-voice data that can be processed by the communications system during the current quota period; and
(ii) storing in the memory, a second quota value representing a system total bytes quota balance indicating the number of bytes of non-voice data that can still be processed by the communications system during the current quota period.

14. The method of claim 13 wherein step (b) further comprises:
(iii) storing in the memory, a third quota value representing a system packet count quota limit indicating a maximum number of non-voice data packets that can be processed by the communications system during the current quota period; and
(iv) storing in the memory, a fourth quota value representing a system packet count quota balance indicating the number of non-voice data packets that can still be processed by the communications system during the current quota period.

15. The method of claim 1 wherein communication signals including voice data are received over a plurality of active voice channels, and step (a) further comprises:
(i) determining the number of active voice channels;
(ii) estimating a maximum processing load required to support a single one of the active voice channels;
(iii) multiplying the number of active voice channels by the estimated maximum processing load, to obtain the processing load dedicated to processing only the voice data for all of the active voice channels;
(iv) determining the processing load actually required to support all of the active voice channels; and
(v) reducing the estimate of the maximum processing load, if the processing load actually required to support all of the active voice channels is less than the estimated maximum processing load.

16. The method of claim 1 wherein communication signals including voice data are received over a plurality of active voice channels, and step (a) further comprises:
(i) for each active voice channel, estimating a maximum processing load required to support the active voice channel; and
(ii) adding the estimated maximum processing loads of each of the active voice channels to determine a total processing load dedicated to processing only the voice data.

17. A communications system that receives and processes packet based communication signals including voice packet data and non-voice packet data, the system comprising:
(a) at least one communication interface which receives the communication signals;

(b) a processor in communication with the interface, and which calculates an estimate of processing load of the communications system dedicated to processing only the non-voice data and establishes values for a plurality of quota data objects based on the estimate, the quota data objects to be used to monitor and control the allocation of the processing load dedicated to processing only the non-voice data during a current quota period; and (c) at least one memory in communication with the processor, and which stores the plurality of quota data objects to be used to monitor and control the allocation of the processing load of the system dedicated to processing only the non-voice data during a current quota period, wherein when a processing load of the voice data changes the estimate of processing load is recalculated and the value of the plurality of quota data objects is re-established.

18. The system of claim 17 wherein the quota data objects comprise:

(i) a first quota value associated with the communication interface, and representing an interface total bytes quota limit indicating a maximum number of bytes of non-voice data that can be processed by the communication interface during the current quota period; and (ii) a second quota value associated with the communication interface, and representing an interface total bytes quota balance indicating the number of bytes of non-voice data that can still be processed by the communication interface during the current quota period.

19. The system of claim 18 wherein the quota data objects further comprise:

(iii) a third quota value associated with the communication interface, and representing an interface packet count quota limit indicating a maximum number of non-voice data packets that can be processed by the communication interface during the current quota period; and (iv) a fourth quota value associated with the communication interface, and representing an interface packet count quota balance indicating the number of non-voice data packets that can still be processed by the communication interface during the current quota period.

20. The system of claim 17 wherein the communication interface is a broadband telephony interface (BTI) located in a voice-over-cable modem (VoCM).

21. The system of claim 17 wherein the communication interface is an embedded Media Terminal Adapter (eMTA) located in a voice-over-cable modem (VoCM).

22. A computer-implemented method of allocating processing load of a packet based communications system that receives and processes communication signals including voice packet data and non-voice packet data, the method comprising:

(a) measuring processing load of the communications system dedicated to processing only the non-voice data;

(b) establishing values for a plurality of quota data objects based on the measured processing load; and (c) using the plurality of quota data objects to monitor and control the allocation of the processing load dedicated to processing only the non-voice data during a current quota period wherein when a processing load of the voice data changes the value of the plurality of quota data objects is re-established.

23. The method of claim 22 wherein the communications system includes a plurality of communication interfaces and at least one memory, and step (b) further comprises:

(i) storing in the memory, for each of the communication interfaces, a first quota value representing an interface total bytes quota limit indicating a maximum number of bytes of non-voice data that can be processed by the communication interface during the current quota period; and (ii) storing in the memory, for each of the communication interfaces, a second quota value representing an interface total bytes quota balance indicating the number of bytes of non-voice data that can still be processed by the communication interface during the current quota period.

24. The method of claim 23 further comprising:

(c) periodically establishing a new current quota period; and (d) setting the quota values to predetermined values when the new current quota period is established.

25. The method of claim 23 further comprising:

(c) establishing a new current quota period after a quota limit established for one of the communication interfaces is exceeded and previously unavailable processing load is currently available to process the non-voice data.

* * * * *